(12) United States Patent
Suchocki

(10) Patent No.: US 6,699,124 B2  
(45) Date of Patent: Mar. 2, 2004

(54) AMUSEMENT GAME INCENTIVE POINTS SYSTEM

(75) Inventor: Edward J. Suchocki, Buffalo Grove, IL (US)

(73) Assignee: Midway Amusement Games LLC, Chicago, IL (US)

(*) Notice: Subject to any disclaimer, the term of this patent is extended or adjusted under 35 U.S.C. 154(b) by 129 days.

(21) Appl. No.: 09/836,515

(22) Filed: Apr. 17, 2001

(65) Prior Publication Data

US 2002/0151364 A1 Oct. 17, 2002

(51) Int. Cl.[7] .................................................. A63F 13/00
(52) U.S. Cl. ........................................... 463/42; 700/92
(58) Field of Search .............................. 463/1, 40–43; 700/90–92; 705/11, 14, 15

(56) References Cited

U.S. PATENT DOCUMENTS

| | | | |
|---|---|---|---|
| 3,221,260 A | 11/1965 | Henrion | |
| 3,351,929 A | 11/1967 | Wagner | |
| 3,569,617 A | 3/1971 | Allen et al. | |
| 3,602,702 A | 8/1971 | Warnock | |
| 3,778,810 A | 12/1973 | Hayashi | |
| 3,786,479 A | 1/1974 | Brown et al. | |
| 4,016,362 A | 4/1977 | Bristow et al. | |
| 4,034,990 A | 7/1977 | Baer | |
| 4,072,930 A | 2/1978 | Lucero et al. | |
| 4,126,851 A | 11/1978 | Okor | |
| 4,127,849 A | 11/1978 | Okor | |
| 4,174,517 A | 11/1979 | Mandel | |
| 4,335,809 A | 6/1982 | Wain | |
| 4,372,558 A | 2/1983 | Shimamoto et al. | |
| 4,521,014 A | 6/1985 | Sitrick | |
| 4,564,923 A | 1/1986 | Nakano | |
| 4,570,930 A | 2/1986 | Matheson | |
| 4,572,509 A | 2/1986 | Sitrick | |
| 5,083,271 A | 1/1992 | Thacher et al. | |
| 5,292,125 A | 3/1994 | Hochstein et al. | |
| 5,350,176 A | 9/1994 | Hochstein et al. | |
| 5,483,444 A | * 1/1996 | Heintzeman et al. | 705/14 |
| 5,558,339 A | * 9/1996 | Perlman | 463/23 |
| 5,674,128 A | 10/1997 | Holch et al. | |
| 5,685,775 A | 11/1997 | Bakoglu et al. | |
| 6,029,141 A | * 2/2000 | Bezos et al. | 705/10 |
| 6,226,621 B1 | * 5/2001 | Warsh | 705/14 |
| 6,334,111 B1 | * 12/2001 | Carrott | 705/14 |
| 6,424,951 B1 | * 7/2002 | Shurling et al. | 705/14 |

* cited by examiner

*Primary Examiner*—Gene Mancene  
*Assistant Examiner*—Patrick Buechner  
(74) *Attorney, Agent, or Firm*—Jenkens & Gilchrist

(57) ABSTRACT

A system for providing incentives to promoters for recommending games to players of games is provided. The system comprises one or more game machines located at one or more game sites. Each of the game machines are adapted to receive input from a player of a game indicative of an identity of a promoter of a game. The system further comprises a database adapted to store information indicative of the identity of a promoter.

37 Claims, 3 Drawing Sheets

AMUSEMENT GAME INCENTIVE POINTS SYSTEM

FIELD OF THE INVENTION

The present invention relates generally to amusement game machines and, more particularly, to an incentive system that rewards promotion of amusement games.

BACKGROUND OF THE INVENTION

Traditionally, amusement gaming machines such as those found in arcades and other social and entertainment establishments have been limited in scope to providing entertainment for those on site at the single amusement gaming machine. Competition on such games has taken the form of competition between players on the same game at the same time, or between players on the same game at different times via a high score system in the amusement gaming machine.

With the increasing ability of communications technology to handle large streams of information, a desire has sprung up between players of amusement gaming machines to expand the scope of competition in the same way that other forms of communication have been expanded. Further, there is a general desire among players of amusement games to increase the number of participants in a competition to make competitions more contested and exciting.

Many amusement game operators, including those who provide amusement games to various establishments such as video arcades, restaurants, taverns, etc., have found that the success and popularity of an amusement game is often directly related to endorsements of a game by the employees of an establishment. Additionally, the providing of amusement games at an establishment, such as a restaurant or tavern, can significantly increase customer traffic into the establishment and consequently increase revenues, including earnings from the amusement games. Even where the cost of the game is nominal, or free, an establishment benefits by the physical presence of amusement game players who are likely to consume product sold by the establishments. Additionally, establishments physically located more "out of the way" experience increased customer traffic due to the presence of amusement games at the establishment. Typically, the profits from amusement games are divided (not necessarily evenly) between the owners of the amusement game(s) and the establishment owners. The employees of an establishment, including waitress and bartenders, that interact with customers throughout the day can make recommendations to customers about which games to play. A game's popularity can increase significantly as the employees of an establishment recommend the game. An increase in a game's popularity can lead to increased revenues for the establishment and for the operator's of the games. It follows, that both establishment owners and amusement game operators will profit from the amusement game recommendations given by the employees of an establishment. There exists a need for an incentive system whereby the employees of an establishment are encouraged and rewarded for the game recommendations given by that employee.

SUMMARY OF THE INVENTION

A system for providing incentives to promoters for recommending games to players of games is provided. The system comprises one or more game machines located at one or more game sites. Each of the game machines are adapted to receive input from a player of a game indicative of an identity of a promoter of a game. The system further comprises a database adapted to store information indicative of the identity of a promoter.

The above summary of the present invention is not intended to represent each embodiment, or every aspect, of the present invention. Additional features and benefits of the present invention will become apparent from the detail description, figures, and claim set forth below.

BRIEF DESCRIPTION OF THE DRAWINGS

The forgoing and other advantages of the invention will become apparent upon reading the following detailed description and upon reference to the drawings in which.

Figure 1:
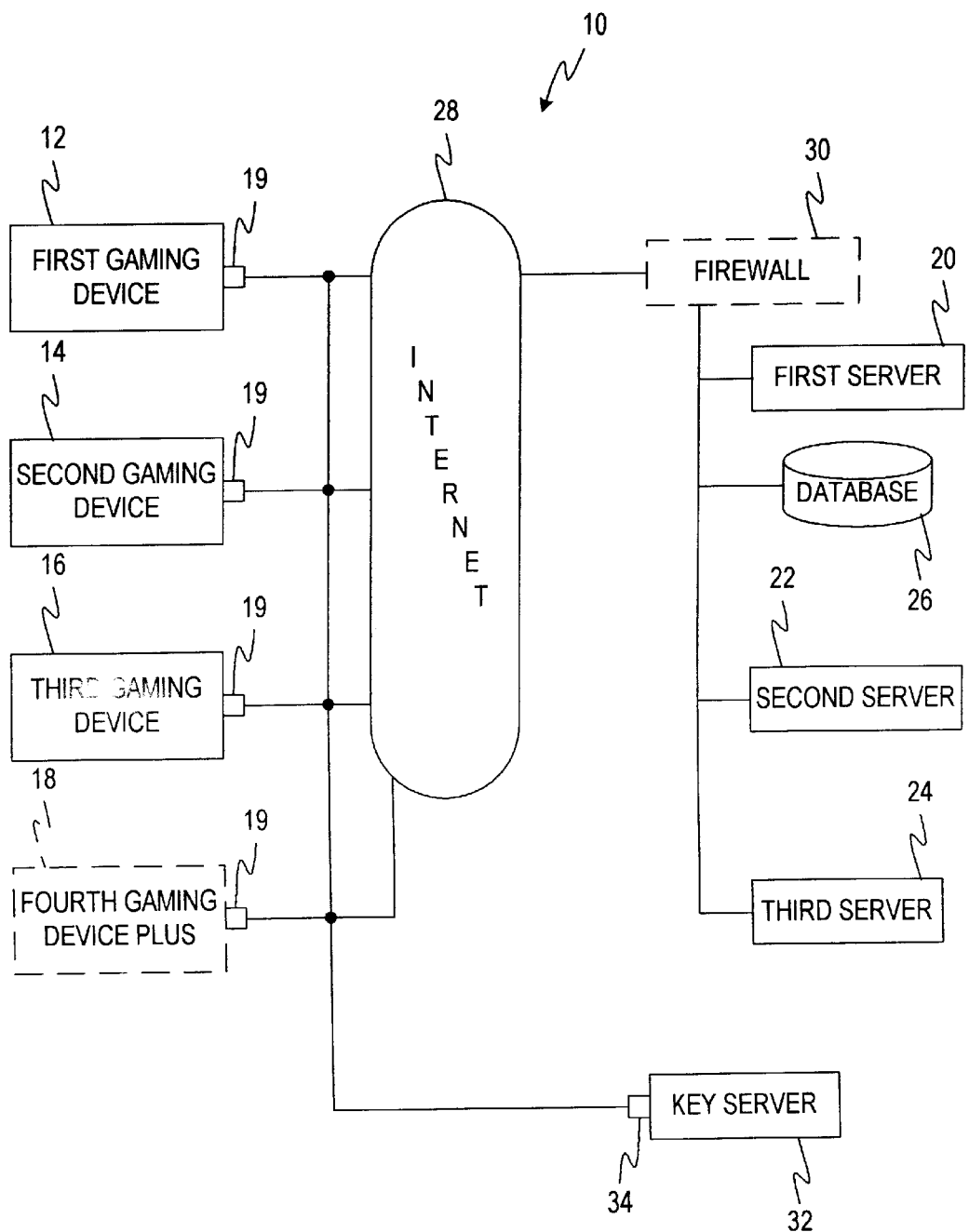
FIG. 1 is a block diagram illustrating components and connections in a tournament network according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed herein. Rather, the invention is to cover all modifications, equivalents, and alternatives falling within the spirit and scope of the invention as defined by the appended claims.

DESCRIPTION OF THE ILLUSTRATIVE EMBODIMENTS

Turning now to the drawings and referring initially to FIG. 1, there is depicted a tournament network 10 according to one embodiment of the present invention having a plurality of gaming devices 12–18 linked thereto. The tournament network is described in detail in commonly-owned, co-pending U.S. Provisional Patent Application Serial No. 60/271,968 entitled "Tournament Network for Linking Amusement Games," which was filed on Feb. 28, 2001 and is incorporated herein by reference in its entirety. The gaming devices 12, 14, 16, and 18 may be different amusement games, being adapted for use in amusement game tournaments. The fourth gaming device (plus) 18 is shown to indicate that a number of additional amusement gaming devices may be adapted for use with the tournament network (indeed the tournament network is capable of supporting hundreds of amusement games or more). Each amusement gaming device 12–18 has a connected communication device 19 such as, for example, a modem or an ethernet card.

The gaming devices 12–18 may be identical amusement gaming devices, or they may be a variety of different types of amusement devices. For example, a first gaming device 12 may play a racing game, a second gaming device 14 may play a golf game, and a third gaming device 16 may be a game capable of playing a variety of different puzzle or arcade-style games. The tournament network 10 is adapted to manage tournaments among two or more different types of games, as well as tournaments involving only one game type. The amusement gaming devices 12–18 may be located at a variety of types of businesses or workplaces or in homes.

While the tournament network is discussed in conjunction with amusement games machine, the present invention is also applicable to other types of gaming devices such as casino gaming machines.

The tournament network 10 provides a standardized environment for conducting tournaments between individual gaming devices 12–18 on a variety of scales. Under one manner of enabling such functionality in the present invention, the gaming devices 12–18 are equipped to communicate with one or more centralized servers 20, 22, and 24 and further to send information to or retrieve information from one or more databases 26. One method of enabling this communication is to connect the gaming devices 12–8, the servers 20–24 the database 26 via the Internet 28. The servers 20–24 may be web servers, and further they may be adapted to execute servlets which may initiate and complete the tasks involved in coordinating tournaments on the network. According to an alternative embodiment, each of the gaming devices may be linked directly to the servers, and not to the Internet. Or, alternatively still, each of the gaming device periodically "dial-in" directly to the servers.

In order to maintain the integrity of information sent between the components of the tournament network 10, a number of security schemes may be employed. For example, a firewall 30 may be set up between the gaming devices 12–18 and the server and database components. Further, a key server 32 with a key server communication device 34 could be employed, as is known in the communications field. The tournament network 10 allows a variety of functions to be performed by the gaming devices 12–18, the servers 20–24, and the database 26 to create a seamless interactive tournament environment for game players.

Figure 2:
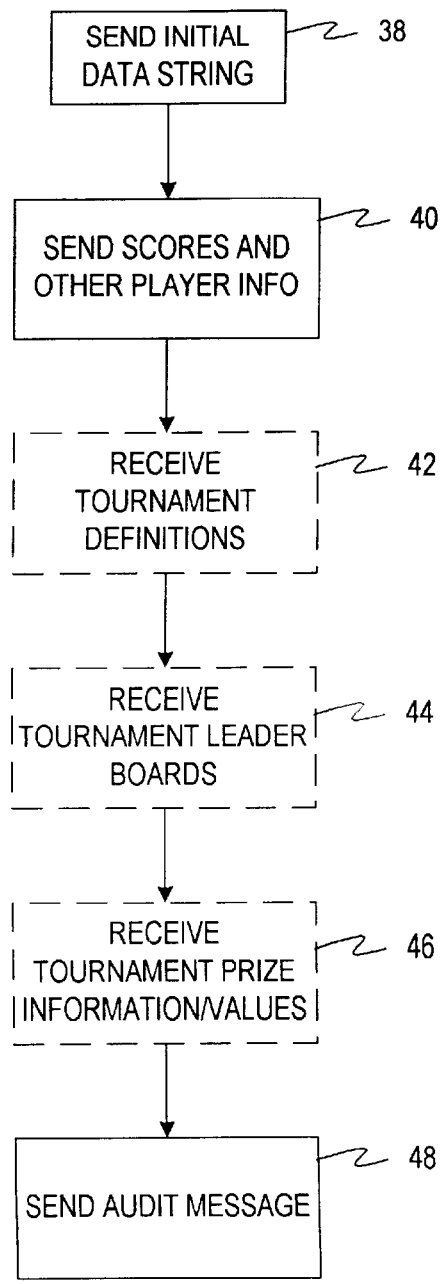
FIG. 2 is a block diagram of a tournament update routine according to one embodiment of the present invention.

Periodically, such as during the course of a tournament or at the conclusion of a tournament, information such as player scores and rankings are updated so that players can receive updates on their status in the tournament. A tournament may be automatically initiated by the servers 20–24, or initiated manually by users of the servers, or they may be requested and/or initiated by owners or operators of gaming devices adapted for use with the tournament network. A tournament having a longer duration may require one or more tournament update routines to be carried out by the gaming devices 12–18 and by the servers 20–24, and further may require multiple updates to or queries of the database 26. One type of tournament update routine 36 is illustrated in FIG. 2.

Tournament update routines may be carried out via calls automatically being made by an amusement gaming device 10 through a communication device 19 at predetermined times, or they may be manually initiated by users of the amusement gaming device 10. Further, alternative tournament update routines may be used wherein one or more of the servers 20, 22, and 24 are adapted to initiate tournament update communications with one or more of the amusement gaming devices 12–18.

One type of tournament update routine 36 is initiated by an amusement gaming device 12. The tournament update routine 36 begins with the sending of an initial data string from the amusement gaming device 12, as shown at block 38. The initial data string contains information initializing the communication, and may further contain information pertaining to the identity of the sending amusement gaming device 12 and protocol data units (PDUs) defining the type of information transmission. Further, the initial data string contains information identifying the transmission as a tournament update transmission.

Next, as shown at block 40, scores, lap times, and other information from players participating in a tournament are sent from the gaming device 12 to the server 20. These scores may have been stored over a period of several minutes or several hours by the gaming device 12 before being sent. In one embodiment, the gaming device 12 stores player scores and other information until an internal memory is filled, and then automatically initiates a tournament update routine 36.

As shown at block 42, the gaming device 12 may optionally receive tournament definitions from the server 20. Tournament definitions include the information necessary for the gaming device 12 to offer a tournament choice to a player, including the game or games involved in the tournament, the region of the tournament, the tournament duration, the expected skill level of the tournament, and other tournament-related information.

Next, as shown at block 44, the gaming device 12 may optionally receive tournament leader board information from the server 20. The server 20 may query the database 26 using structured query language (SQL) or other querying methods to receive this information, or the information may be stored locally on the server. One or more servers may constantly be adding or retrieving information to and from the data base 26 to create information compilations such as a tournament leader board.

Block 46 shows another optional operation that may be carried out during the tournament update routine. Here, the gaming device 12 may receive tournament prize information and/or values from the server 20. The tournament prize types and values can vary based on the number of tournament participants, the types of games involved in the tournament, the difficulty of the tournament or skill of players in the tournament, and other factors related to the tournament.

Next, at block 48, the gaming device 12 sends an audit message to the server 20. The audit message is used in the tournament network 10 to keep track of several pieces of information dealing with the status of a gaming device 12. The audit message includes such information as gaming device and/or communications device statistics, error conditions of the gaming device and/or communications device, percentage of disk space currently in use on a gaming device and amount of remaining disk space, play counts, the number of different players, the total number of credits, service credits, and free plays granted on the gaming device, and other information regarding the day-to-day operation of a gaming device. The audit message optionally contains a log of operations performed by the gaming device 12.

Tournaments may vary according to alternative embodiments depending on how different tournaments are defined. Some tournaments involve numerous different games, while other tournaments may involve a single game. For example, one tournament may involve two plays of a driving game, four plays of a golf game, and one play of a particular puzzle game resident on a gaming machine capable of playing numerous games. Additionally, the duration of each tournament can vary from among different tournaments. For example, a tournament involving seven different plays may have a duration of three days. This would require players entering the tournament to play the required amount of games within three days. If a player falls short of the required number, the player's score may be decreased accordingly, or the player may be disqualified from the tournament. Tournaments may also be set up according to grouping information that defines a variety of player and/or gaming machine characteristics that will be involved in the tournament. One type of grouping criterion is location-based grouping. It is believed that subdividing a nationwide tournament network into defined locations will increase the competitive nature of a tournament within a geographical region. Additionally, various tournaments may have different options for scoring types, weights to be given to different games, possible vector components for different games, and operations to be used in developing aggregate scores. Alternatively, tournament winners may be determined directly from the highest ranking scorers on each game.

A player may participate in a tournament by simply playing an amusement gaming device 10. In order to identify the player for the purposes of computing and comparing scores, creating player profiles which include a player's tournament history, and awarding prizes, it will be necessary for a player to identify himself to the gaming device 10 so that the player's scores and other information can be forwarded to a tournament server 20. Several different types of identification are available. For example, this identification can take the form of an identification card, such as a magnetic card or a smart card, or it may take the form of a username and password that is input into the gaming device 10 before the player plays a game. In addition, a player may identify himself and pay for tournament fees or the costs of individual games by using a credit card, debit card, financial smart card, or other identification device. These devices may be used in combination with a personal identification number ("PIN") issued by the card issuer, or in combination with a tournament number issued by a tournament operator. Further, special tournament cards may be issued by tournament operators to identify players and/or to identify tournaments in which players are playing.

After identifying himself to a gaming device 10, a player may be presented with a tournament selection screen giving the player a choice of possible tournaments to begin or to continue participating in. This list may be formed during the tournament update routine 36, and may be modified in response to a player recognition by the gaming device 10. The gaming device 10 may receive a list of all possible tournaments that users of the gaming device 10 may participate in, and further may narrow this list down for a player so as to display only long term tournaments that the player is already competing in. After selecting a tournament, the player plays a tournament game, and the player's game score and other statistics are stored at the gaming device 10 until the next tournament update routine 36 is initiated.

Further details of the tournament network are described in commonly-owned, co-pending U.S. Provisional Patent Application Serial No. 60/271,968 entitled "Tournament Network for Linking Amusement Games," which was incorporated by reference above.

In addition to providing a forum in which amusement game players can compete against one another at a variety of levels, one embodiment of the tournament network 10 implements a tournament incentive point system ("TIPS rewards program") that rewards employees of an establishment having amusement games for the promotion of those amusement games 12–18 linked to the tournament network 10. As discussed above in the background section, employee promotion of the amusement games at an establishment can significantly increase the popularity of these amusement games and consequently increase that establishment's revenues.

According to one embodiment of the TIPS rewards program of the present invention, individual employees of an establishment ("promoters") participating in the TIPS rewards program are registered with the tournament network 10. Upon initiating a tournament game or upon completing a tournament game, the gaming device 12–18 prompts the player for the identity of the promoter who recommended the game. A list of registered promoters' names are listed on a display (not shown) of the gaming device 12–18. The player can scroll through the listing of registered promoters and select the promoter who in fact recommended the game to the player. Alternatively, the player can key in the promoter's name or other identifying information.

According to one embodiment of the present invention, a promoter is awarded a specific number of "TIPS rewards points" each time a player completes a tournament game and selects a promoter's name. The more frequently players indicate that a particular promoter has recommended a tournament game, the more points that promoter will be awarded. At certain times or on the accumulation of a predetermined number of points, a promoter may exchange that promoter's accumulation of points for prizes and/or cash. For example, upon the accumulation of a certain number of points a promoter may be awarded $20 cash or, alternatively, a non-cash prize such as a good or service. As a promoter accumulates a greater the number of points, the promoter becomes eligible for prizes having greater values.

Many variations on the number of points awarded to a promoter can be implemented in the TIPS program. According to one embodiment, a promoter is awarded one (1) point each time that promoter's name is selected by a player. A promoter may be awarded an additional number of points if that promoter recommends a game to a player who goes on to win a tournament. Extra points may also be awarded to promoters of an establishment if that establishment has a tournament winner. Other point enhancing schemes may also be implemented, such as awarding bonus points to a promoter who earns a predetermined number of points within a specific window of time. Or, alternatively, the number of awarded bonus points may be a function of the player's overall performance in a tournament. Put another way, the promoter who recommended a game to player who ranks highly in a tournament may be awarded bonus points. Or, alternatively still, a promoter having the most points may be awarded bonus points. In still another alternative embodiment, game tracking information (e.g., promoter identity, promoted game or tournament, time, date, location, etc.) is maintained and applied to a later determined point scheme at a later time.

Eligible promoters (e.g., employees of establishments having amusement games 12–18 linked to the tournament network 10) register with the tournament network 10 through one of the gaming devices 12–18 by using controls and/or a keypad (not shown) of a gaming device 12–18. Alternatively, a promoter may register with the tournament network 10 via a tournament network website. Promoters can access the tournament network's website through whatever means they normally access the internet. Each promoter registers by entering information such as that promoter's name, place of employment, and/or other identifying information such as a personal identification number, an identification card, such as a magnetic card or a smart card, or it may take the form of a username and password that is input into the tournament network 10. That information is stored in the database 26 for the tournament network 10. TIPS points awarded to a promoter are also stored in the database 26 along with the score tables for each of the tournaments run by the tournament network 10.

In one embodiment of the present invention, TIPS information including which promoters have endorsed which games are updated pursuant to the tournament update routine 36 illustrated in FIG. 2. In such an embodiment, step 40 includes the gaming device 12 sending TIPS information including, for example, the identification of the promoter(s), which games the promoter(s) has recommended, and the time and/or date at which the endorsement was made. Step 44 includes receiving the TIPS point boards including the number of points per promoter and a ranking of the promoters. TIPS leaders can be determined at a variety of levels such as the promoter who has had the most endorsements of a particular game, regionally or within a given time period. Step 46 includes receiving information regarding the value of the TIPS rewards points and the types of prizes to which the points correspond. Alternatively, a separate TIPS update routine, similar to the tournament update routine described in connection with FIG. 2, can be implemented to update information regarding the TIPS rewards program independently of the tournament update routine 36.

Figure 3:
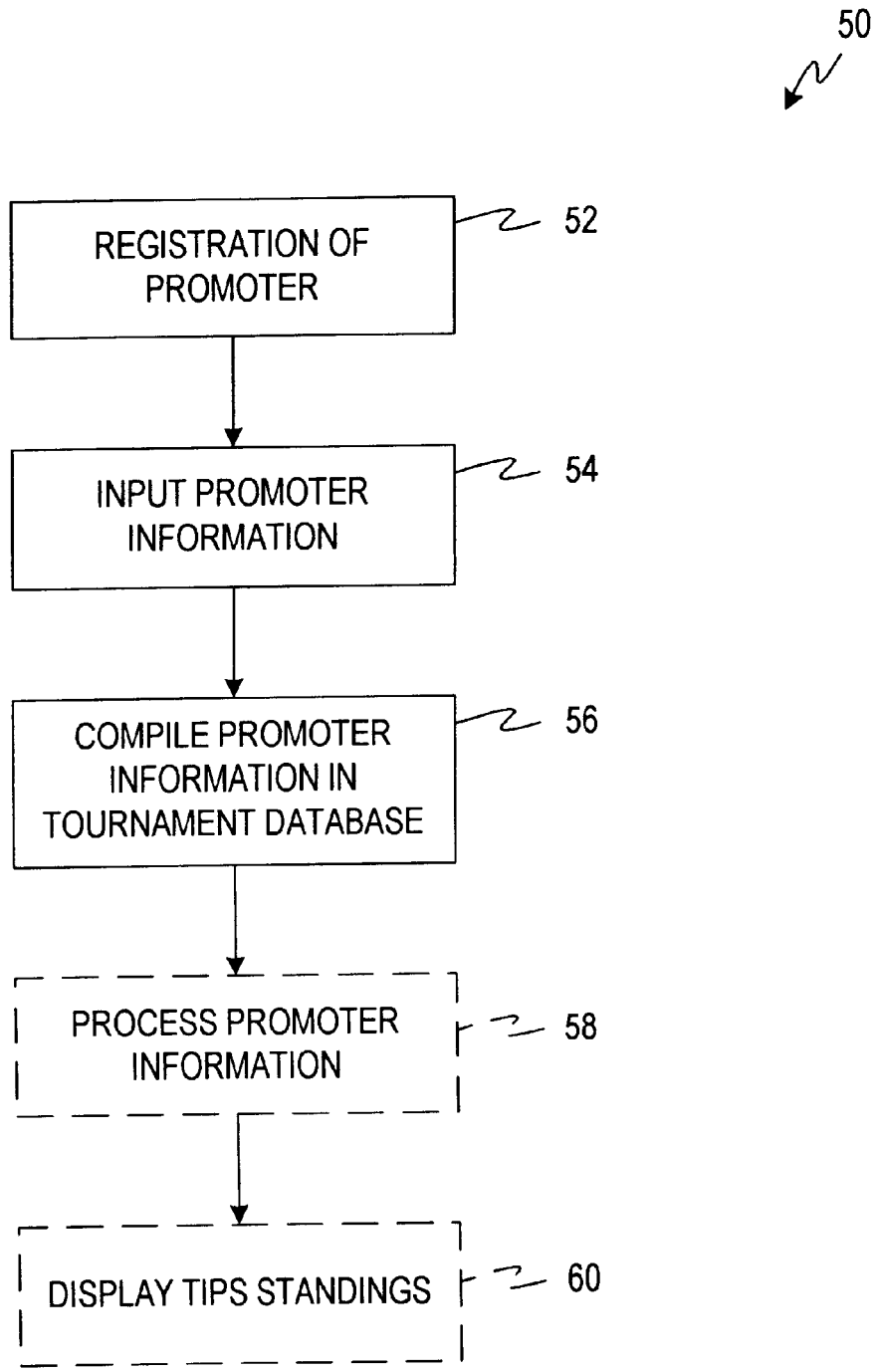
FIG. 3 is a block diagram of tournament incentive points system according to one embodiment of the present invention.

Referring now to FIG. 3, the operation of the TIPS rewards program 50 will be described in greater detail. Promoters register with the tournament network at step 52. Again, a promoter may register with the tournament network 10 via a gaming device 12, over the internet 28 via a tournament network website, or by calling in and registering with the entity overseeing the operation of the tournament network. In conjunction with playing a gaming device 12–18 linked to the tournament network 10, a player inputs the identification of the promoter at step 54. Inputting the promoter information may take the form of inputting the promoter's name or identification number given to the player by the promoter, or selecting from a listing of promoters on a display of the gaming device 10. Preferably, in the later embodiment, only a listing of promoters employed in the particular establishment are displayed to the player. The player may be prompted to input the promoter information before or after playing a tournament game. Once the promoter's identity is indicated, the promoter's identity along with other information including the type of game played, date, time, and location are stored in a memory of the gaming device 12–18.

At step 56, the promoter information received by all of the gaming devices 12–18 (e.g., "game tracking" information— promoter identity, promoted game or tournament, time, date, location, etc.) is communicated to the tournament network 10 and complied in the tournament database 26 (shown in FIG. 1). At step 58, the promoter information is processed by the tournament network 10 at step 58. Processing the promoter information at step 58 includes determining the rankings among the promoters pursuant to the various TIPS rewards programs being conducted. For example, the ranking may be based upon the points per geographic region, per a specific time period, or per type of amusement game. The standings or rankings for the current TIPS rewards programs are then displayed on the gaming devices 12–18 and/or a tournament network website. In one embodiment, steps 56–60 are included in the tournament routine 36 (FIG. 2). For example, promoter information is complied in the database 26 at step 40 of the tournament update routine 36 and the TIPS rankings are received/displayed by the gaming device 12–18 at step 46 of the tournament update routine 36. Alternatively, the operation of the TIPS rewards program 50 can be performed separately from the tournament update routine.

In an alternative embodiment of the present invention, the TIPS rewards program is advertised to players and promoters as well as to other customers of an establishment on the displays of individual amusement game machines. The advertisements may advertise or encourage the TIPS rewards program by requesting players to "vote" for their favorite waiter/waitress or server (e.g., input the promoter's identity when prompted). The advertisements may flash on the display or are otherwise displayed at times when the game machines are not in use. The advertisements may be stored in the tournament network database 26 or other memory of the amusement gaming machines. Additionally, the TIPS point boards may be displayed in conjunction with the advertisements.

While the TIPS rewards program has been discussed in conjunction with the tournament network (e.g., a plurality of gaming machines at a plurality of locations linked together), the present invention is also applicable to non-networked amusement gaming machines. For example, the TIPS rewards program may be conducted in conjunction with a single gaming machine in an establishment. Relevant promoter information including promoter information and identify, points per promoter, and specific point enhancing schemes are stored in a database contained within the individual amusement game machine. Alternatively, in other embodiments, amusement game machines located at a single game site are networked together but not networked outside of the single game site.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed:

1. A system for providing incentives to promoters for recommending games to players of games, the system comprising:

a plurality of game machines for playing games, the game machines being located at a plurality of game sites wherein one or more promoters are located at each game site, each game machine being adapted to prompt a player for input indicative of an identity of a promoter of a game and to receive input from the player indicative of the identity of the promoter of the game, the plurality of game machines being adapted for electronic communication including communicating information indicative of the identity of a promoter;

a game server communicatively coupled to the plurality of game machines, the game server being adapted to electronically communicate with the game machines, the game server is adapted to receive the information indicative of the identity of a promoter inputted to a game machine by a player; and a database communicatively coupled to the game server, the database being adapted to store the information indicative of the identity of a promoter inputted to a game machine by a player.

2. The system of claim 1 wherein the plurality of the game machine are adapted to receive promoter registration information from the game promoters, the sever receiving the promoter registration information inputted to the game machines by game promoters.

3. A system for providing incentives to promoters for recommending games to players of games, the system comprising:

a plurality of game machines located at a plurality of game sites, each of the game machines being adapted to prompt a player of a game for input indicative of an identity of a promoter of a game and to receive input from a player of a game indicative of an identity of a promoter of a game, one or more promoters being located at each game site; and a database communicatively linked the gaming machines, the database being adapted to store information indicative of the identity of a promoter.

4. The system of claim 3 wherein the database is further adapted to store additional information selected from the group consisting of the time at which a player inputs the identity of a promoter, the date on which a player inputs the identity of a promoter, the site at which a player inputs the identity of a promoter, and the type of game played by a player that inputs the identity of a promoter.

5. The system of claim 3 wherein each of the game machines include a display and a promoter selection element, the promoter selection element being adapted to permit the player to scroll through a listing of promoters displayed on the display and to select a promoter from the listing.

6. The system of claim 3 wherein the database is housed within one of the game machines.

7. The system of claim 3 wherein the database is remotely located from the game machines and linked thereto via a computer network.

8. The system of claim 3 wherein the game machines comprise amusement game machines.

9. The system of claim 3 wherein the game machines comprise casino game machines.

10. The system of claim 3 further comprising one or more central processing units adapted to rank each of the promoters according to one or more criteria.

11. The system of claim 10 wherein the criteria are selected from a group consisting of game machine site, geographic region, game machine type, game machine site type, the time at which a player inputs the identity of a promoter, the date at which a player input the identity of a promoter, the frequency at which the identity of a particular promoter is input, and the game played by a player that input the identity of a promoter.

12. The system of claim 3 wherein the game machines are adapted for electronic communication including communicating the information indicative of the identity of a promoter, and wherein the system further comprises one or more servers adapted to electronically communicate with each game machine, the one or more servers being adapted to receive information indicative of the identity of a promoter and to store the information in the database.

13. The system of claim 12 wherein the game machines are adapted for electronic communication over the Internet, and wherein the one or more servers are web servers that are adapted for electronic communication via the Internet and adapted to locate and communicate with the game machines via the Internet.

14. The system of claim 12 wherein the one or more servers are adapted to award one or more points to a promoter upon the one or more servers receiving the information indicative of the identity of a promoter.

15. The system of claim 14 wherein the database is adapted to store the one or more points awarded to a promoter of a game.

16. The system of claim 14 wherein the one or more servers are adapted to rank promoters based on the total number of points awarded to each promoter.

17. The system of claim 14 wherein the one or more severs are adapted to award one or more points to a promoter according to one or more criteria.

18. The system of claim 17 wherein the criteria are selected from a group consisting of game machine site, geographic region, game machine type, game machine site type, the time at which a player inputs the identity of a promoter, the date at which a player input the identity of a promoter, the frequency at which the identity of a particular promoter is input, and the game played by a player that input the identity of a promoter.

19. A method for use in providing incentives to promoters for promoting games to players of game machines located at a plurality of different game sites, the method comprising:

registering a promoter located at a game site;

prompting a player for input indicative of an identity of a promoter of a game;

receiving input from the player of the game indicative of an identity of a promoter of the game; and recording the identity of a promoter input by the player of the game.

20. The method of claim 19 wherein receiving input further comprises selecting a promoter from a list of promoters displayed on a display of the game machine.

21. The method of claim 19 wherein recording further comprises recording additional information selected from the group consisting of the time at which a player inputs the identity of a promoter, the date on which a player inputs the identity of a promoter, the site at which a player inputs the identity of a promoter, and the type of amusement game played by a player that inputs the identity of a promoter.

22. The method of claim 19 wherein recording the identity of a promoter includes storing the identity of a promoter in a database housed within the game machine.

23. The method of claim 19 wherein recording the identify of a promoter includes storing the identity of a promoter in a database linked to the game machine via a computer network.

24. The method of claim 19 wherein recording further comprises recording additional information selected from the group consisting of the time at which a player inputs the identity of a promoter, the date on which a player inputs the identity of a promoter, the site at which a player inputs the identity of a promoter, and the type of game played by a player that inputs the identity of a promoter.

25. The method of claim 19 wherein receiving input further comprises receiving input from a player of an amusement game.

26. The method of claim 19 wherein receiving input further comprises receiving input from a player of a casino game.

27. The method of claim 19 further comprising awarding an award to promoters according to the ranking, wherein the award is selected from the group consisting of points, cash or prizes.

28. The method of claim 27 wherein awarding points further comprises awarding point according to one or more criteria selected from a group consisting of game machine site, geographic region, game machine type, game machine site type, the time at which a player inputs the identity of a promoter, the date at which a player inputs the identity of a promoter, and the game played by a player that inputs the identity of a promoter.

29. The method of claim 19 further comprising electronically communicating the identity of a promoter received from a player to a server of a network linked to the game machine.

30. The method of claim 29 wherein electronically communicating further comprises electronically communicating over the Internet.

31. The method of claim 29 wherein recording the identity of a promoter comprises storing the identity of a promoter in a database of the network.

32. The method of claim 19 further comprising awarding one or more points to a promoter each time input is received indicative of the identity of that promoter.

33. The method of claim 32 further comprising storing the number of points awarded to each promoter in a database of the network.

34. The method of claim 32 further comprising ranking the promoters based on the number of points awarded to each promoter.

35. The method of claim 19 further comprising ranking each of the promoters according to one or more criteria.

36. The method of claim 35 wherein the criteria are selected from a group consisting of game machine site, geographic region, game machine type, game machine site type, the time at which a player inputs the identity of a promoter, the date at which a player input the identity of a promoter, the frequency at which the identity of a particular promoter is input, and the game played by a player that input the identity of a promoter.

37. The method of claim 35 further comprising awarding an award to one or more promoters according to the ranking, wherein the award is selected from the group consisting of points, cash, or prizes.

* * * * *